(12) United States Patent
Matsumoto

(10) Patent No.: US 10,449,447 B2
(45) Date of Patent: Oct. 22, 2019

(54) GAME SYSTEM AND STORAGE MEDIUM

(71) Applicant: NINTENDO CO., LTD., Kyoto (JP)

(72) Inventor: Tatsuya Matsumoto, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 223 days.

(21) Appl. No.: 15/220,519

(22) Filed: Jul. 27, 2016

(65) Prior Publication Data

US 2017/0036109 A1 Feb. 9, 2017

(30) Foreign Application Priority Data

Aug. 4, 2015 (JP) .................................. 2015-154010

(51) Int. Cl.
```
A63F 9/24       (2006.01)
A63F 13/00      (2014.01)
G06F 17/00      (2019.01)
G06F 19/00      (2018.01)
A63F 13/32      (2014.01)
A63F 13/25      (2014.01)
A63F 13/95      (2014.01)
```
(52) U.S. Cl.
CPC .............. *A63F 13/32* (2014.09); *A63F 13/25* (2014.09); *A63F 13/95* (2014.09); *A63F 2300/203* (2013.01); *A63F 2300/207* (2013.01)

(58) Field of Classification Search
USPC .................................. 463/20, 21, 39, 42, 43
See application file for complete search history.

(56) References Cited

U.S. PATENT DOCUMENTS

| | | | | |
|---|---|---|---|---|
| 7,147,563 | B2 * | 12/2006 | Miura | A63F 13/335 463/42 |
| 7,155,710 | B2 * | 12/2006 | Breckner | A63F 13/12 717/168 |
| 8,033,913 | B2 * | 10/2011 | Cockerille | G07F 17/323 463/20 |
| 8,187,104 | B2 * | 5/2012 | Pearce | A63F 13/10 463/43 |
| 9,757,652 | B2 * | 9/2017 | Obayashi | A63F 13/497 |

(Continued)

FOREIGN PATENT DOCUMENTS

| | | |
|---|---|---|
| JP | 2004-165750 A | 6/2004 |
| JP | 2011-217803 A | 11/2011 |

(Continued)

*Primary Examiner* — Adetokunbo O Torimiro
(74) *Attorney, Agent, or Firm* — Nixon & Vanderhye, P.C.

(57) ABSTRACT

A non-limiting example game system comprises a server and a plurality of game apparatuses, each game apparatus emulating a game program. If applying a predetermined instruction during a game, a game screen is captured and an image file is produced. Furthermore, at this time, emulator status information is uploaded to the server from a game apparatus. Then, the server transmits a URL indicative of a storing location of the emulator status information to the game apparatus. The game apparatus writes the URL as metadata of the image file, and uploads the image file to the server. Furthermore, the game apparatus downloads a desired image file from the server, and downloads the emulator status information according to the URL that is acquired from the downloaded image file. An emulator status of another game apparatus can be reproduced by reading this emulator state information.

18 Claims, 12 Drawing Sheets

(56) References Cited

U.S. PATENT DOCUMENTS

| | | |
|---|---|---|
| 2012/0329557 A1 | 12/2012 | Takamura et al. |
| 2013/0005481 A1 | 1/2013 | Tagawa et al. |
| 2013/0143672 A1* | 6/2013 | Azuma ................ A63F 13/792 463/42 |
| 2014/0045591 A1 | 2/2014 | Chen |
| 2014/0378210 A1* | 12/2014 | Inukai .................. A63F 13/814 463/24 |
| 2014/0379802 A1 | 12/2014 | Mizuki et al. |
| 2015/0005065 A1* | 1/2015 | Mizuki .................. A63F 13/87 463/31 |

FOREIGN PATENT DOCUMENTS

| | | |
|---|---|---|
| JP | 2013-009818 | 1/2013 |
| JP | 2014-033870 A | 2/2014 |
| JP | 2014-184316 A | 10/2014 |
| JP | 2015-007821 A | 1/2015 |
| JP | 2015-011531 | 1/2015 |
| WO | WO 2015/093108 A1 | 6/2015 |

* cited by examiner

FIG. 7  MEMORY MAP OF RAM 52 OF GAME APPARATUS 20

GAME SYSTEM AND STORAGE MEDIUM

CROSS REFERENCE OF RELATED APPLICATION

The disclosure of the patent application No. 2015-154010 filed on Aug. 4, 2015 is incorporated by reference.

FIELD

This application describes a game system comprising a plurality of game apparatuses and a server and a storage medium.

SUMMARY

A primary object of an embodiment(s) is to provide a novel game system and storage medium.

Furthermore, another object of the embodiment(s) is to provide a game system and a storage medium, capable of sharing a game experience with another player who is separated temporally or spatially.

A first embodiment is a game system, comprising a first game apparatus, a second game apparatus different from the first game apparatus and a server. The first game apparatus comprises a first execution portion, an image file production portion and a file transmission portion. Furthermore, the second game apparatus comprises an image file acquisition portion and a second execution portion. The first execution portion is configured to execute a game according to a game program in the first game apparatus. The image file production portion is configured to produce an image file that includes reproduction information required in order to reproduce a scene of the game according to the game program that is currently executed by the first execution portion as metadata, and image data of the game. The file transmission portion is configured to transmit the image file that is produced by the image file production portion to the server. In the second game apparatus, the image file acquisition portion is configured to acquire the image file from the server. For example, the image file that is selected by a player of the second game apparatus is downloaded (acquired) from the server. The second execution portion is configured to execute the same kind of game program as the game program based on the reproduction information included in the image file that is acquired by the image file acquisition portion while designating a scene of the game to be reproduced.

According to the first embodiment, the second game apparatus acquires the reproduction information that is transmitted to the server from the first game apparatus, and reproduces the scene of the game about the game program based on the reproduction information by executing the game program corresponding to acquired reproduction information, and therefore, it is possible for a player to share a game experience with another player who is separated temporally or spatially.

A second embodiment is according to the first embodiment, wherein the first game apparatus further comprises a status information transmission portion. The status information transmission portion is configured to acquire, when the game program is executed by the first execution portion, at least status information including game data about the game of the game program, and transmit acquired status information to the server. Furthermore, the second game apparatus further comprises a status information acquisition portion. The status information acquisition portion is configured to acquire the status information from the server according to the reproduction information included in the image file that is acquired by the image file acquisition portion. The second execution portion is configured to execute the game program with using the status information that is acquired by the status information acquisition portion.

According to the second embodiment, since the status information includes the game data, if executing the game program by reading the game data, the game can be reproduced based on the status information including game data.

A third embodiment is according to the second embodiment, wherein the reproduction information includes information indicative of a storing location of the status information, and the status information acquisition portion is configured to acquire the status information from the storing location that is indicated by the reproduction information.

According to the third embodiment, since the reproduction information and the status information are saved separately, by providing a server that manages the reproduction information and a server that manages the status information, processing and communication can be distributed.

A fourth embodiment is according to the third embodiment, wherein the image file production portion is configured to acquire the information indicative of a storing location of the status information from the server when the status information is transmitted to the server by the status information transmission portion, and produce the image file that includes as metadata the information indicative of a storing location of the status information.

According to the fourth embodiment, since the information indicative of the storing location of the status information is included in the image file, if acquiring the image file, based on the information indicative of the storing location of the status information, this status information can be acquired.

A fifth embodiment is according to the second embodiment, wherein each of the first game apparatus and the second game apparatus further comprises an emulator execution portion configured to execute an emulator program. Therefore, each of the first execution portion and the second execution portion is configured to emulate the game program by executing the emulator program by the emulator execution portion. In addition, the status information is status information of an emulator.

According to the fifth embodiment, since the status information at the time of emulation-execution by a further game apparatus is acquired, if emulating the game program while reading the acquired status information, a scene of the game at the time when the status information is acquired by the further game apparatus can be reproduced.

A sixth embodiment is according to the second embodiment, wherein the status information is a game parameter in the game program. Furthermore, each of the first execution portion and the second execution portion executes the game program with using the game parameter.

According to the sixth embodiment, since the game program is executed with using the game parameter, it is possible to reproduce a scene of the game at the time when the game parameter is acquired.

A seventh embodiment is according to the first embodiment, wherein the server comprises a screen production portion configured to produce screen data corresponding to a selection screen for selecting a single image file from a plurality of image files. The second game apparatus further comprises an image selection portion configured to select a single image file from the plurality of image files in the selection screen corresponding to the screen data that is produced by the screen production portion. The image file acquisition portion is configured to acquire the image file that is selected by the image selection portion.

According to the seventh embodiment, since a desired image file is selected from the plurality of image files and the selected image file is acquired, a scene of the game can be reproduced based on the reproduction information included in the desired image file.

An eighth embodiment is according to the first embodiment, wherein the image file is of a general-purpose file format.

According to the eighth embodiment, since the image file is of the general-purpose file format, it is easy to handle.

A ninth embodiment is according to the eighth embodiment, wherein the general-purpose file format is a JPEG format.

According to the ninth embodiment, it is also easy to handle, like the eighth embodiment.

A tenth embodiment is according to the ninth embodiment, wherein the reproduction information is described in a user comment area that is included in Exif data of the image file of the JPEG format.

According to the tenth embodiment, it is also easy to handle, like the eighth embodiment.

An eleventh embodiment is according to the first embodiment, wherein each of the first execution portion and the second execution portion is capable of executing a plurality of different kinds of game programs. The file transmission portion is configured to transmit image files about scenes of games of the plurality of different kinds of game programs to the server.

According to the eleventh embodiment, it is possible to execute various kinds of game programs, and can contribute an image file about the scene of the game of each of the game programs.

A twelfth embodiment is a game apparatus, comprising: an execution portion configured to execute a game program; an image file production portion configured to produce an image file that includes reproduction information required in order to reproduce a scene of a game of the game program that is currently executed by the first execution portion as metadata and image data of the game; and a file transmission portion configured to transmit the image file that is produced by the image file production portion to a server.

According to the twelfth embodiment, the game apparatus can transmit to the server the image file that includes reproduction information required in order to reproduce a scene of a game by a further game apparatus as metadata, and image data of the game.

A thirteenth embodiment is a game apparatus, comprising: an image file acquisition portion configured to acquire an image file from the server; and an execution portion configured to execute a game program about a game based on the reproduction information included in the image file that is acquired by the image file acquisition portion while designating a scene of the game to be reproduced.

According to the thirteenth embodiment, since the game apparatus acquires the reproduction information that is transmitted to the server from a further game apparatus, and reproduces a scene of the game of the game program based on the reproduction information while designating a scene of the game to be reproduced, it is possible for a player to share a game experience with another player who is separated temporally or spatially.

A fourteenth embodiment is a non-transitory computer-readable storage medium storing a control program executable by a game apparatus that is included in a game system comprising a plurality of game apparatuses and a server, wherein the control program causes a computer of the game apparatus to function as: an image file production portion configured to produce an image file that includes reproduction information required in order to reproduce a scene of a game about a game program that is executed by the game apparatus as metadata and image data of the game; and a file transmission portion configured to transmit the image file that is produced by the image file production portion to the server.

According to the fourteenth embodiment, like the twelfth embodiment, the game apparatus can transmit to the server the image file that includes reproduction information required in order to reproduce a scene of a game by a further game apparatus as metadata, and image data of the game.

A fifteenth embodiment is a non-transitory computer-readable storage medium storing a control program executable by a game apparatus that is included in a game system comprising a plurality of game apparatuses and a server, wherein the control program causes a computer of the game apparatus to function as: an image file acquisition portion configured to acquire an image file from the server; and an execution portion configured to execute a game program about a game based on the reproduction information included in the image file that is acquired by the image file acquisition portion while designating a scene of the game to be reproduced.

According to the fifteenth embodiment, like the thirteenth embodiment, it is possible for a player to share a game experience with another player who is separated temporally or spatially.

A sixteenth embodiment is a game controlling method of a game apparatus that is included in a game system comprising a plurality of game apparatuses and a server, a computer of the game apparatus performing steps of: (a) executing a game program; (b) producing an image file that includes reproduction information required in order to reproduce a scene of a game of a game program that is executed in the step (a) as metadata and image data of the game; and (c) transmitting the image file that is produced in the step (b) to the server.

According to the sixteenth embodiment, like the twelfth embodiment, it is possible to transmit to the server the image file that includes reproduction information required in order to reproduce a scene of the game by a further game apparatus as metadata and image data of the game.

A seventeenth embodiment is a game controlling method of a game apparatus that is included in a game system comprising a plurality of game apparatuses and a server, a computer of the game apparatus performing steps of: (a) acquiring an image file from the server; and (b) executing a game program of a game based on the reproduction information included in the image file that is acquired in the step (a) while designating a scene of the game to be reproduced.

According to the seventeenth embodiment, like the thirteenth embodiment, it is possible for a player to share a game experience with another player who is separated temporally or spatially.

The above described objects and other objects, features, aspects and advantages of the embodiments will become more apparent from the following detailed description when taken in conjunction with the accompanying drawings.

DETAILED DESCRIPTION OF NON-LIMITING EXAMPLE EMBODIMENTS

First Embodiment

Figure 1:
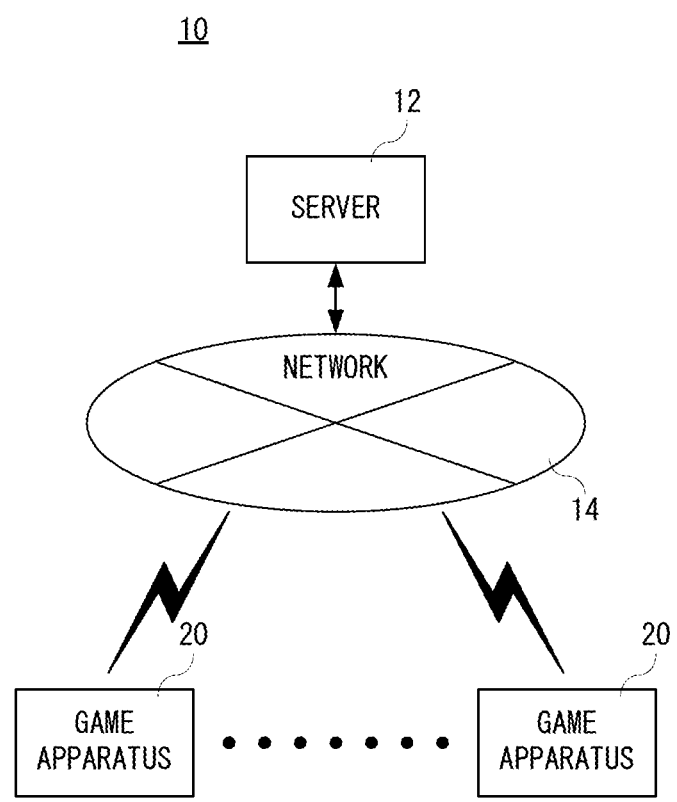
FIG. 1 is an illustration view showing a non-limiting example game system.

With reference to FIG. 1, a non-limiting example game system 10 includes a server 12. The server 12 is connected with a plurality of game apparatuses 20 in a communicable manner via a network 14 such as an internet. A game apparatus 20 is a portable or non-portable game apparatus.

Figure 2:
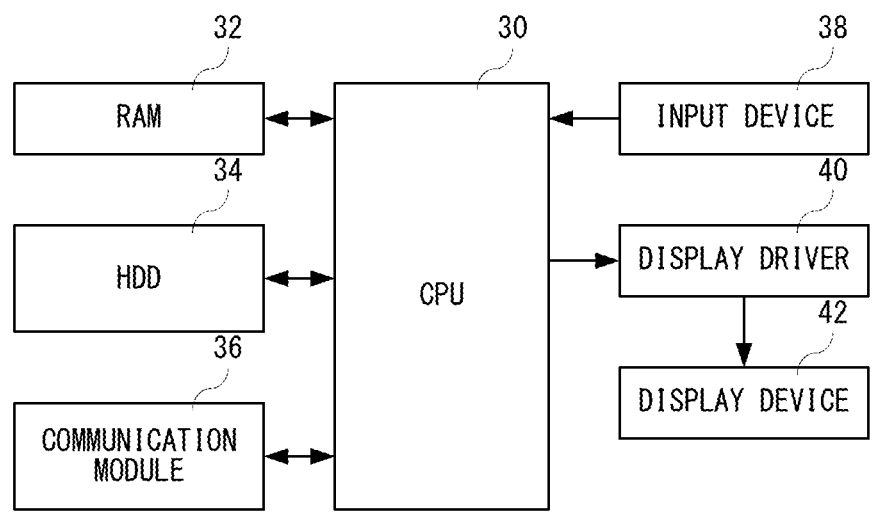
FIG. 2 is a block diagram showing non-limiting example electric structure of a server shown in FIG. 1.

FIG. 2 is a block diagram showing a non-limiting example electric structure of the server 12 shown in FIG. 1. The server 12 is a general-purpose server, and as shown in FIG. 2, it includes a CPU 30. A RAM 32, an HDD 34, a communication module 36, an input device 38 and a display driver 40 are connected to the CPU 30. Furthermore, a display device 42 is connected to the display driver 40.

The CPU 30 is in charge of overall control of server 12. The RAM 32 is used as a working memory and buffer memory for the CPU 30. The HDD 34 is a main storage device of the server 12, and used in order to store an operating system (OS), various kinds of application programs, various kinds of data such as contents for distributing, etc. The contents of this first embodiment are an image file of an image that an execution screen of various kinds of applications is captured and predetermined data when capturing the execution screen, as described later.

The communication module 36 has a function of connecting to a LAN. Therefore, the server 12 can perform communication with other computers and the game apparatuses 20 directly or via the network 14.

The input device 38 is a keyboard, a computer mouse, etc., for example. The display driver 40 is used in order to display various screens on the display device 42 under instructions of the CPU 30. The display driver 40 incorporates a GPU and a video RAM (VRAM).

In addition, the electric structure of the server 12 shown in FIG. 2 is a mere example, and does not need to be limited to this.

Figure 3:
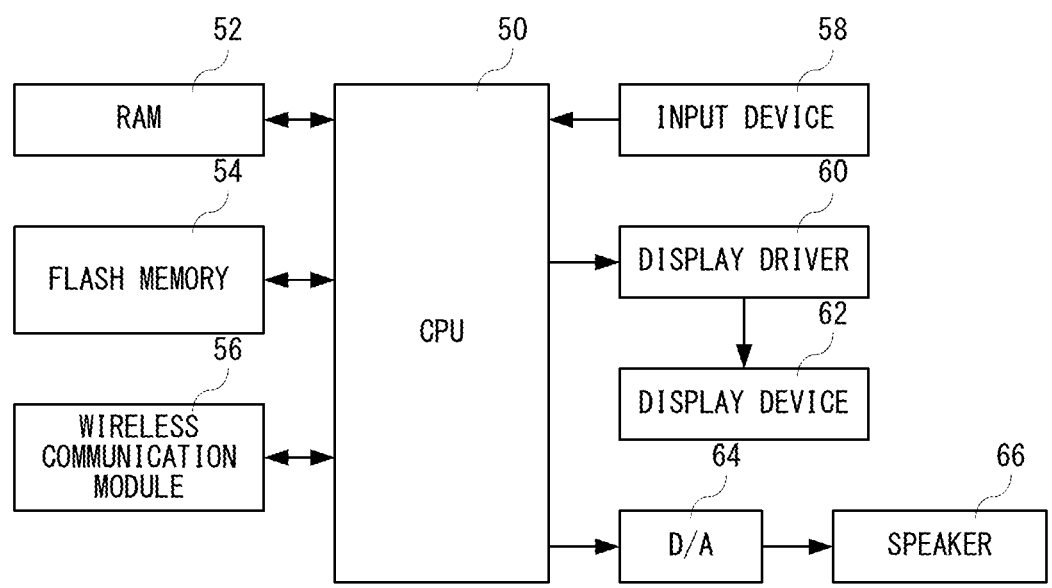
FIG. 3 is a block diagram showing non-limiting example electric structure of a game apparatus shown in FIG. 1.

FIG. 3 is a block diagram showing a non-limiting example electric structure of the game apparatus 20 shown in FIG. 1. As shown in FIG. 3, the game apparatus 20 includes a CPU 50, and the CPU 50 is connected with a RAM 52, a flash memory 54, a wireless communication module 56, an input device 58, a display driver 60 and a D/A converter 64. Furthermore, a display device 62 is connected to the display driver 60, and a speaker 66 is connected to the D/A converter 64.

The CPU 50 is in charge of overall control of the game apparatus 20. The RAM 52 is used as a working memory and buffer memory for the CPU 50. The flash memory 54 is used in order to store (save) a program of an application such as a game and various kinds of data.

The wireless communication module 56 has a function of connecting to a wireless LAN. Therefore, the game apparatus 20 can perform communication with other game apparatuses 20 and computers (server 12 etc.) directly or via the network 14. The input devices 58 is various kinds of push buttons or switches that are provided on the game apparatus 20, for example, and used for various kinds of operations such as menu selection and game operation by a user or a player (hereinafter, simply called a "player"). However, as the input device 58, an input portion such as a pointing device such as a touch panel, etc., a microphone, a camera, etc. may be provided instead of the push buttons or switches, or together with the push buttons or switches.

The display driver 60 is used in order to display various kinds of screens such as an execution screen (game screen, for example) of the application on the display device 62 under instructions of the CPU 50. Although illustration is omitted, the display driver 60 contains a GPU and a VRAM.

The D/A converter 64 converts voice data that is input from the CPU 50 into an analog audio signal, and outputs the same to the speaker 66. When an application is a game, for example, an audio signal may be a sound signal corresponding to a sound required for the game, such as an imitation sound of a game character, sound effects and music (BGM). Furthermore, in a case of an application other than a game, an audio signal may be a sound signal corresponding to a sound required for execution of the application, such as sound effects and music (BGM).

In addition, the electric structure of the game apparatus 20 shown in FIG. 3 is a mere example, and does not need to be limited to this.

The game apparatus 20 executes various application programs. As an application, various kinds of applications such as a game application, an e-mail application, a painting application, a letter exercise application, a language training application, a learning application, etc. can be recited.

Although omitted in FIG. 3, the game apparatus 20 may have structure that can attach a recording medium such as CD or DVD, or SD card (memory card), and a game application program can be acquired from such a recording medium. However, the game apparatus 20 may be connected with a server that provides various kinds of application programs in a communicable manner so as to download (acquire) a game application program from this server. The server 12 may function as a server that provides an application program, for example.

Furthermore, the game apparatus 20 can execute an emulator program. By executing the emulator program, the game apparatus 20 can emulate a further game apparatus having different structure, thereby executing a game program for the further game apparatus through emulation. It should be noted that "emulation" means that a game program of a further game apparatus is executed with using virtual hardware that emulates the further game apparatus. Therefore, it is possible for the game apparatus 20 to play the game for the further game apparatus. The further game apparatus may be game apparatuses provided in the past, game apparatuses having different hardware structure, or the like, for example. Therefore, it is possible to play games for non-portable game apparatus with the portable game apparatus 20. Furthermore, it is also play games for portable game apparatuses with the non-portable game apparatus 20. Furthermore, it is also to play games for game apparatuses from manufacturer different from that of the game apparatus 20 with the game apparatus 20.

Furthermore, an emulator program is provided for each game program (application of game etc.) to be emulated, and is acquired from a storage medium attachable to the game apparatus 20 or from the server 12 together with the game program that is to be emulated. Although an emulator program is provided for each game program to be emulated, as an example, it does not need to be limited to this. An emulator program may be provided for each platform. In addition, the platform means hardware such as various kinds of game apparatuses, computers (including a tablet terminal, a mobile phone and a smart phone) having a game function or/and an operating system.

In the following, in this specification, especially when not put otherwise stated, the game program is a game program that is to be emulated in the game apparatus 20. It is a matter of course, the game device 20 can execute a game program for the game apparatus 20 without using the emulator.

Figure 4:
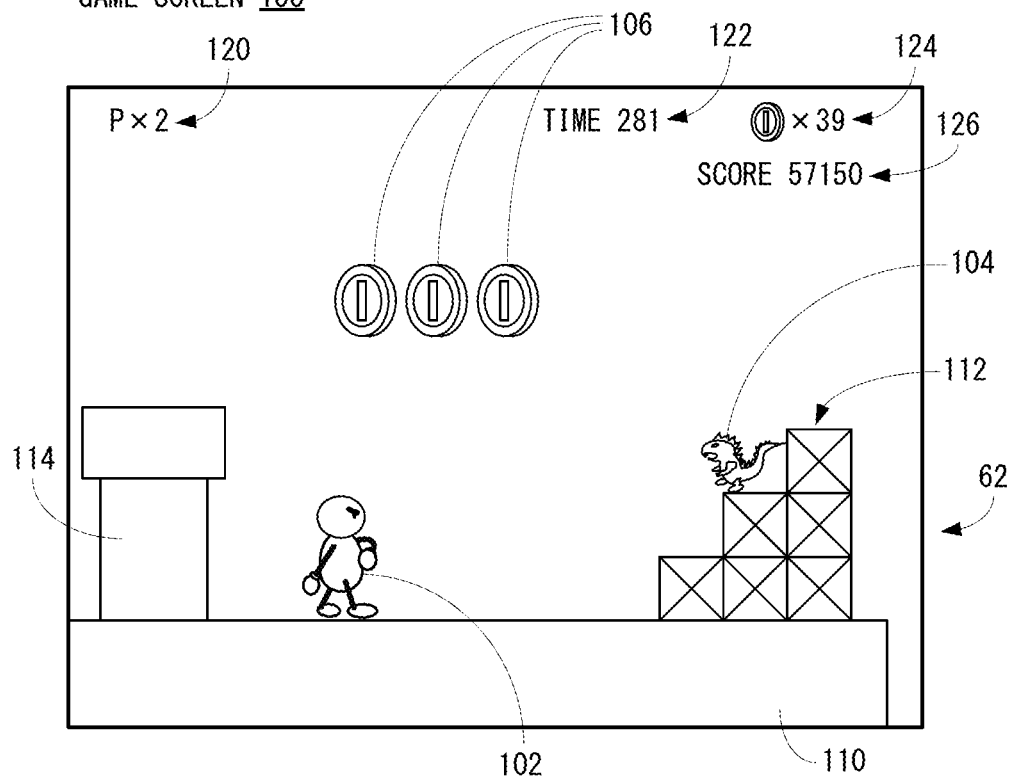
FIG. 4 is an illustration view showing a non-limiting example game screen displayed on a display of the game apparatus shown in FIG. 3.

FIG. 4 is an illustration view showing a non-limiting example game screen 100 displayed on the display device 62 in the game apparatus 20 shown in FIG. 1 and FIG. 3, when emulating the game program.

The game screen 100 shown in FIG. 4 is an image that takes a part of a virtual course provided in a virtual space in a virtual game with a virtual camera. A player character 102 and an enemy character 104 are displayed in this game screen 100. Furthermore, coin objects 106 are displayed in the game screen 100. In the example shown in FIG. 4, the player character 102 is positioned on a ground object 110, and three coin objects 106 are arranged above this player character 102. Furthermore, the enemy character 104 is positioned on a plurality of block objects 112 stacked stepwise. Furthermore, a clay pipe object 114 is provided to be pierced in the ground object 110.

This game is an action adventure game of horizontal scrolling, for example, and the player character 102 can perform an arbitrary action according to an operation by the player, such as moving a virtual course, jumping, acquiring items such as the coin object 106, or stomping the enemy character 104 etc.

If the player character 102 reaches a goal set up in the course within a time limit, the course becomes to be completed. Furthermore, when completing all the courses, the game becomes to be completed. However, if the player character 102 receives an attack by the enemy character 104 or protrudes from the course, becoming a mistake, and therefore, a remaining number of the player character 102 is subtracted by one (1). Then, if the remaining number becomes zero (0), the game is made over.

A character string 120 indicative of the remaining number of the player character 102 is displayed in an upper left portion of the game screen 100 shown in FIG. 4, and a character string 122 indicative of a remaining time in a portion rightward from an upper center of the game screen 100. Furthermore, a character string etc. (an image and a character string) indicative of a total number of acquired coin objects 106 is displayed in a right upper portion of the game screen 100, and a character string 126 indicative of a total score until now is displayed below the same.

As described above, if emulating the game program and inputting by a player a predetermined instruction (contribution instruction, in the first embodiment), in the game apparatus 20, a game screen 100 at the time when inputting the predetermined instruction is taken (captured). At this time, an image file according to a predetermined format (JPEG format, for example) is produced about image data (screen data) corresponding to an image that the game screen 100 is captured (screen shot). Exif (Exchangeable image file format) data (Exif information) is included in the image file. For example, identification information (game ID) about the game program that is emulated is written as information on the software (application) included in Exif data.

Since an image file of a general-purpose data format is thus produced, handling is easy. For example, a general-purpose data format means a data format that can be used by various kinds of application programs and a data format that can be used by various kinds of hardware.

Furthermore, if inputting the predetermined instruction, status information of the emulator (emulator status information) at that time is uploaded (transmitted) to the server 12. Here, the emulator status information means status information of an emulated virtual CPU and an emulated virtual memory, being expressed with single binary data. Furthermore, the status information of the virtual CPU is data stored in various kinds of registers included in the virtual CPU, and the status information of the virtual memory is image data stored in an emulated virtual VRAM and game data (game parameter) stored in an emulated virtual RAM.

The game data means data about a virtual course under playing, various kinds of characters and various kinds of objects existing in this virtual course and those positions, a state (a size, transformation) of the player character 102, a remaining number, a remaining time, kinds of items owned by the player character 102 and the number of the items, a score, etc, for example. This is an example, and contents of game data (data about application) change dependent on a kind of a game (application).

Therefore, when emulator status information is reflected in an emulator of a further game apparatus (a further game apparatus 20, for example) different from the game apparatus 20, for example, in the further game apparatus 20, the same scene (game scene or game situation) at the time that the emulator status information is acquired by the game apparatus 20 is reproduced and the game can be played from the reproduced scene. That is, the emulator status information includes information that is not insufficient in order to reproduce a specific moment of the game apparatus that is being emulated. If an image that is captured at the time when a contribution instruction is input is an image corresponding to the game screen 100 shown in FIG. 4, for example, when reproducing a game scene based on the emulator status information, the game screen 100 shown in FIG. 4 is displayed on the display device 62.

When receiving (acquiring) the emulator status information (status information data) that is transmitted from the game apparatus 20, the server 12 stores the same in the HDD 34. Furthermore, the server 12 transmits a URL indicative of a storing location (saving location) of this status information data to the game apparatus 20 that is a transmission source of this status information data.

When receiving the URL that is transmitted from the server 12, the game apparatus 20 writes the URL into a user comment area included in the Exif data of the image file, and uploads the image file in which the URL is written to the server 12. That is, the URL indicative of the storing location of the emulator status information is included as metadata of the image file. When receiving the image file that is transmitted from the game apparatus 20, the server 12 stores the same in the HDD 34.

In this first embodiment, the server 12 stores (manages) the image file and the status information data uploaded (contributed) from each of one or more game apparatuses 20, and the server 12 provides a service to distribute contributed image file and status information data according to a request from each game apparatus 20.

Therefore, in the first embodiment, the player selects a scene that he/she wants to play by seeing a capture image, and can acquire information (reproduction information) required in order to reproduce the scene. The server 12 transmits, in response to a request from the game apparatus 20, data of a list of image files (a selection screen 200 described later, in this first embodiment) to the game apparatus 20, for example.

Figure 5:
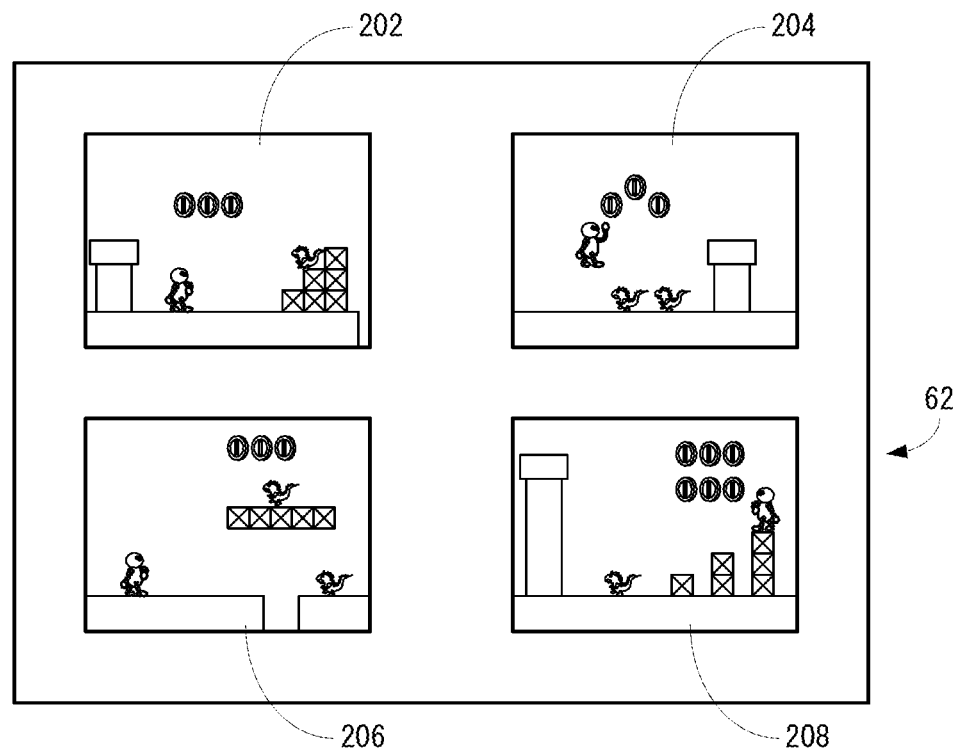
FIG. 5 is an illustration view showing a non-limiting example selection screen displayed on the display of the game apparatus shown in FIG. 3.

FIG. 5 is an illustration view showing a non-limiting example selection screen 200 displayed on the display device 62 of the game apparatus 20. The game apparatus 20 displays the selection screen 200 on the display device 62 according to the data (screen data of the selection screen 200) that is transmitted from the server 12.

As shown in FIG. 5, a plurality of reduced images 202, 204, 206 and 208 are displayed on the selection screen 200. The reduced images 202-208 are images that the capture images are reduced in size. The image obtained by reducing the capture image may be produced (reduced) by reading a capture image from the image file that is registered in the HDD 34 of the server 12, or a thumbnail image included in the image file may be used.

In addition, although four (4) reduced images are displayed in the selection screen 200 in the example shown in FIG. 5, the number of reduced images does not need to be limited.

Furthermore, although the example shown in FIG. 5 shows the selection screen 200 that the reduced images 202-208 about one kind of game are displayed, since the game apparatus 20 can execute various kinds of games, there is an occasion that the selection screen 200 that the reduced images 202-208 of various kinds of games are included is displayed. Therefore, if the selection screen 200 is displayed on the display device 62, the player can select not only a scene that he/she wants to play but a game to play.

If the player selects a single desired reduced image (202, 204, 206 and 208), information about the selected reduced image, that is, an acquisition request of the image file corresponding to the reduced image is transmitted to the server 12. If receiving the information about the reduced image, the server 12 reads an image file corresponding to this reduced image from the HDD 34, and transmits the read image file to the game apparatus 20 that is a transmission source of the information about the reduced image.

If receiving the image file that is transmitted from the server 12, the game apparatus 20 accesses the server 12 according to the URL described in the user comment area included in the Exif data of this image file, thereby acquiring (downloading) the emulator status information. Then, the game apparatus 20 reads the acquired emulator status information (status information data 604*d* described later) into the RAM 52. That is, in the first embodiment, the reproduction information is the URL included as metadata of the image file, and the emulator status information for actually reproducing the scene of the game according to this URL is acquired.

Furthermore, in the game apparatus 20, a single desired reduced image (202, 204, 206 and 208) is selected, and in response to having acquired the image file, the corresponding game program is emulated. However, the game program to be emulated is distinguished according to the software information (game ID) read from the Exif data of the acquired image file.

As described above, since the acquired emulator status information is read-in and reflected in the emulator of the game apparatus 20, the scene of the game when this emulator status information is contributed is reproduced. Therefore, the player can play a continuation of the reproduced game. That is, the player can designate the scene of the game to be reproduced in the selection screen 200, and reproduce the scene of the designated game so as to play the continuation thereof.

Figure 6:
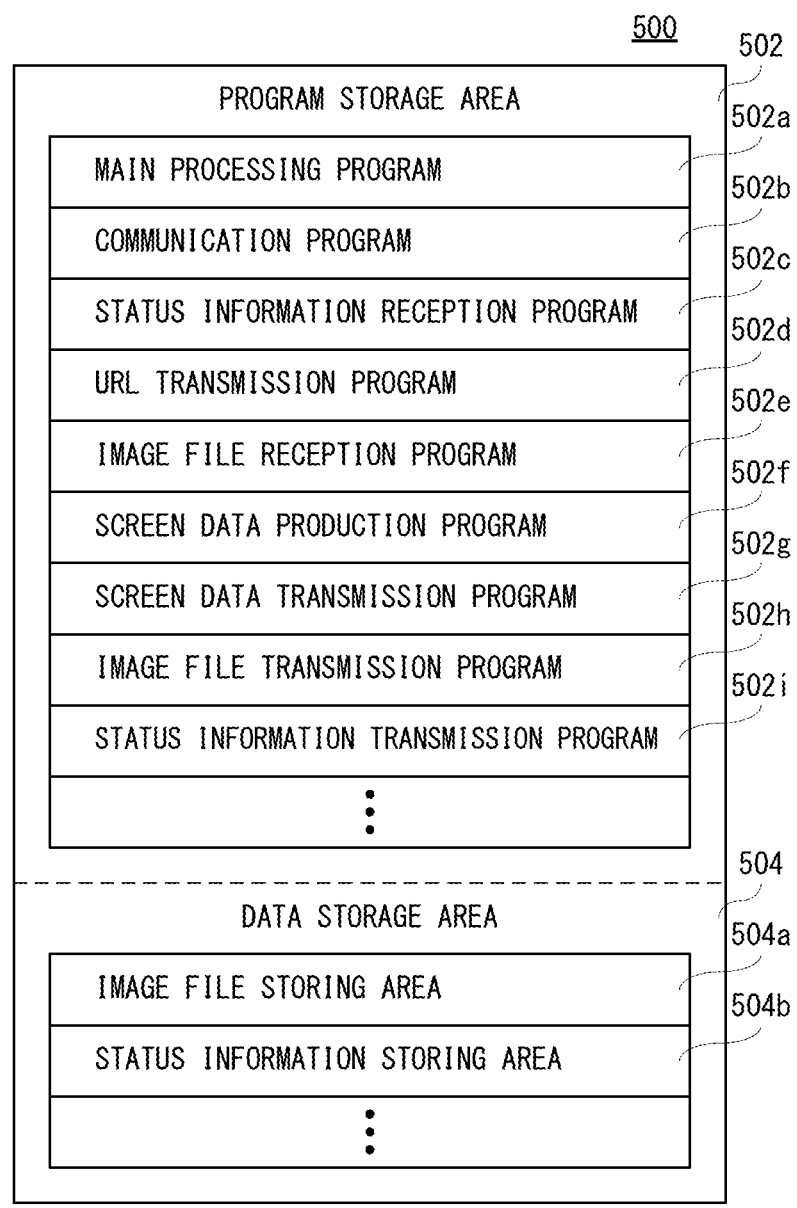
FIG. 6 is a view showing a non-limiting example memory map of a RAM of the server shown in FIG. 2.

FIG. 6 is an illustration view showing a non-limiting example memory map 500 of the RAM 32 of the server 12 shown in FIG. 2. Programs shown in FIG. 6 are read from the HDD 34 wholly at once or partially and sequentially as necessary to be stored in the RAM 32.

As shown in FIG. 6, the RAM 32 includes a program storage area 502 and a data storage area 504. An information processing program is stored in the program storage area 502, and the information processing program may be constituted by a main processing program 502*a*, a communication program 502*b*, a status information reception program 502*c*, a URL transmission program 502*d*, an image file reception program 502*e*, a screen data production program 502*f*, a screen data transmission program 502*g*, an image file transmission program 502*h*, a status information transmission program 502*i*, etc.

The main processing program 502*a* is a program for processing a main routine in the server 12. The communication program 502*b* is a program for performing communication with other computers and the game apparatus 20. The status information reception program 502*c* is a program for receiving the emulator status information (status information data) that is uploaded (transmitted) from a game apparatus such as the game apparatus 20 or a computer having a game function, and for storing (registering) the received status information data in a memory (HDD 34). At this time, communication with the game apparatus 20 etc. is performed according to the communication program 502*b*. Hereinafter, this is true for a case of performing transmitting processing or receiving processing.

The URL transmission program 502*d* is a program for transmitting a URL indicative of a storing location of the emulator status information to the game apparatus 20 that is a transmission source transmitting the emulator status information. The image file reception program 502*e* is a program for receiving the image file that is uploaded (transmitted) from a game apparatus such as the game apparatus 20 or a computer having a game function, and for storing (saving) the received image file in a memory (HDD 34).

The screen data production program 502*f* is a program for producing, in response to a display request transmitted from the game apparatus 20, screen data corresponding to the selection screen 200 with using the image data of one or more capture images included in each of one or more image files stored in the HDD 34 or the image data of the thumbnail image. The screen data transmission program 502*g* is a program for transmitting the screen data corresponding to the selection screen 200 produced according to the image data production program 502*f* to the game apparatus 20 that is a request source that transmits the display request of the selection screen 200.

The image file transmission program 502*h* is a program for transmitting, in response to a transmission request of the image file transmitted from the game apparatus 20, the image file by reading from the HDD 34 to the game apparatus 20 that is a request source that transmits the transmission request. The status information transmission program 502*i* is a program for transmitting, in response to a transmission request of the emulator status information transmitted from the game apparatus 20, the emulator status information by reading from the HDD 34 to the game apparatus 20 that is a request source that transmits this transmission request.

Although illustration is omitted, in the program storage area 502, a program for authentifying a player or a game apparatus 20, etc. are also stored.

An image file storing area 504*a* and a status information storing area 504*b* are provided in the data storage area 504. The image file storing area 504*a* is a storing area for storing temporarily the image file that is transmitted or received to or from the game apparatuses 20 etc. Furthermore, the status information storing area 504*b* is a storing area for storing temporarily the emulator status information (status information data) that is transmitted or received to or from the game apparatuses 20 etc.

Although illustration is omitted, in the data storage area 504, other data required for the information processing in the server 12 are also stored. Furthermore, a counter(s) (timer(s)) or/and a flag(s) required for the information processing in the server 12 are provided in the data storage area 504.

Figure 7:
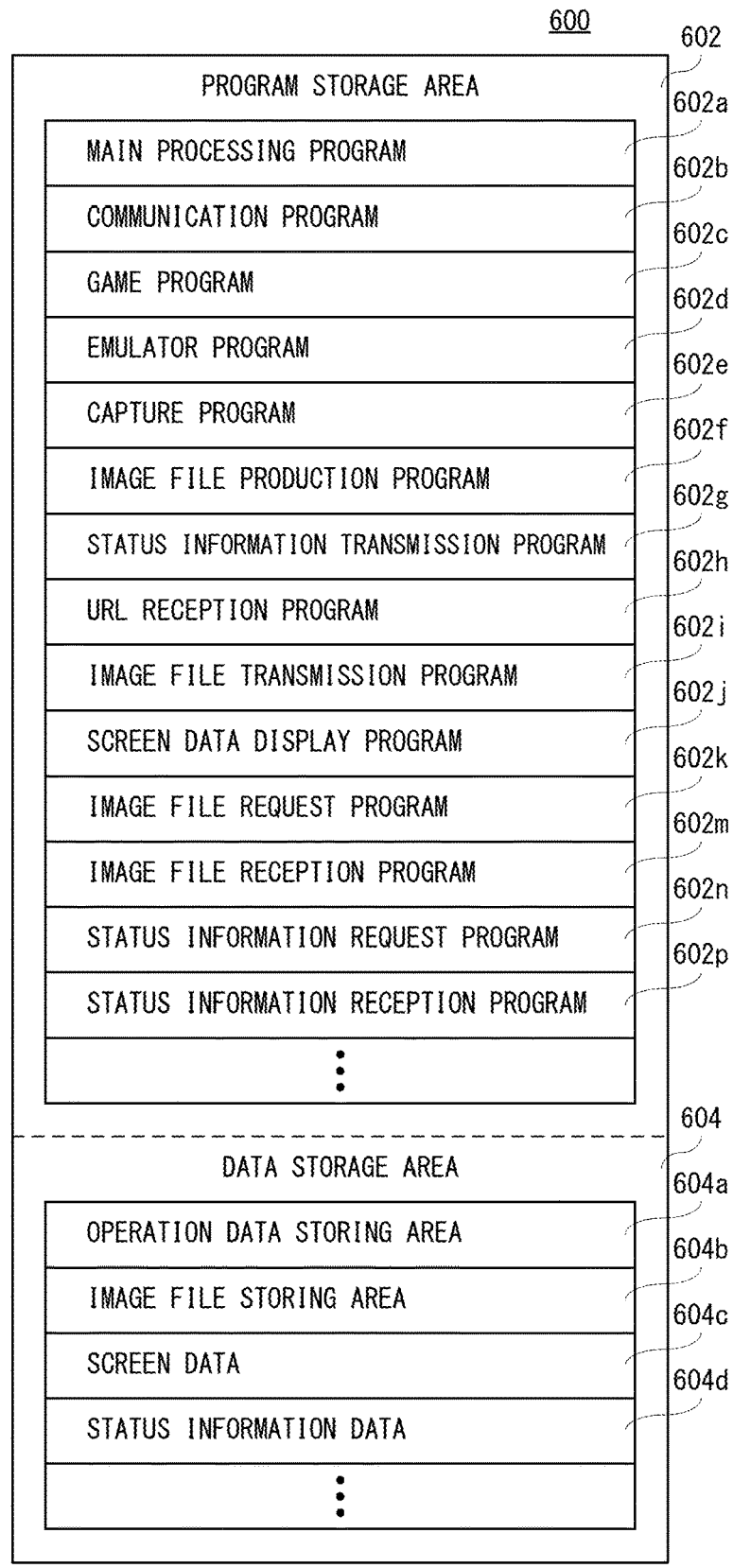
FIG. 7 is an illustration view showing a non-limiting example memory map of a RAM of the game apparatus shown in FIG. 3.

FIG. 7 shows a non-limiting example memory map 600 of the RAM 52 of the game apparatus 20 shown in FIG. 3. Programs shown in FIG. 7 are read from the flash memory 54 wholly at once or partially and sequentially as necessary to be stored in the RAM 52.

As shown in FIG. 7, the RAM 52 includes a program storage area 602 and a data storage area 604. An information processing program is stored in the program storage area 602, and the information processing program may be constituted by a main processing program 602*a*, a communication program 602*b*, a game program 602*c*, an emulator program 602*d*, a capture program 602*e*, an image file production program 602*f*, a status information transmission program 602*g*, a URL reception program 602*h*, an image file transmission program 602*i*, a screen data display program 602*j*, an image file request program 602*k*, an image file reception program 602*m*, a status information request program 602*n*, a status information reception program 602*p*, etc.

The main processing program 602*a* is a program for processing a main routine in the game apparatus 20. The communication program 602*b* is a program for performing communication with a computer (server 12, in this first embodiment) and other game apparatuses 20. The game program 602*c* is a program about an arbitrary game, and in this first embodiment, is a program to be emulated through execution of the emulator program 602*d*. The emulator program 602*d* is a program corresponding to the above-described game program 602*c*, and is a program for emulating this game program 602*c*.

The capture program 602*e* is a program for capturing the game screen 100 when a predetermined instruction (contribution instruction, in this first embodiment) is input. That is, the data of the capture image that the game screen 100 is captured is acquired.

The image file production program 602*f* is a program for producing the image file of the JPEG format about the data of the capture image acquired according to the capture program 602*e*. Furthermore, the image file production program 602*f* acquires from the server the URL indicative of the storing location (storing location in the server 12, in this first embodiment) as meta-information of an image file (metadata), and stores the URL. However, the URL indicative of the storing location of the status information data is notified (transmitted) from the server 12 in response to transmission of the status information data to the server 12. Furthermore, the image file production program 602*f* stores, as information of the software included in the metadata of the image file, a game ID about the game program corresponding to the image data included in the image file.

The status information transmission program 602*g* is a program for acquiring (copying, for example), when a predetermined instruction is input, the emulator status information (status information data 604*d*) at the present and transmitting (uploading) the acquired emulator status information to the server 12. At this time, communication with the server 12 is performed according to the communication program 602*b*. Hereinafter, this is true for a case of performing transmission processing or reception processing.

The URL reception program 602*h* is a program for receiving the URL that is transmitted from the server 12 when the emulator status information is transmitted to the server 12 according to the status information transmission program 602*g*.

The image file transmission program 602*i* is a program for transmitting (uploading) the image file that is produced according to the image file production program 602*f* to the server 12. The screen data display program 602*j* is a program for receiving the screen data about the selection screen 200 transmitted from the server 12, and displaying the selection screen 200 on the display device 62 with using the received screen data.

The image file request program 602*k* is a program for transmitting a transmission request of the image file that is selected with using the selection screen 200 by the player to the server 12. The image file reception program 602*m* is a program for receiving the image file that is transmitted from the server 12 when the transmission request of the image file is transmitted to the server 12 according to the image file request program 602*k*.

The status information request program 602*n* is a program for transmitting a transmission request of the emulator status information to the server 12 according to the URL included in the image file that is received from the server 12. The status information reception program 602*p* is a program for receiving from the server 12 the emulator status information that transmission is requested according to the status information request program 602*n*.

Although illustration is omitted, the program storage area 602 is also stored with a program for producing screen data corresponding to various kinds of screens (main menu screen etc.) other than the game screen produced that is produced by emulation, a program for outputting (displaying) the produced screen data on the display device 62, a program for producing and outputting a sound, a program for saving (storing) the data produced (updated) by executing the application, etc.

The data storage area 604 is formed with an operation data storing area 604a and an image file storing area 604b, and stored with screen data 604c and status information data 604d.

The operation data storing area 604a is a storing area for storing temporarily operation data that is input from the input device 58 according to a time series. However, the operation data having been used for the processing of the CPU 50 is deleted from the operation data storing area 604a. The image file storing area 604b is a storing area for storing temporarily the image file that is transmitted or received to or from the servers 12.

The screen data 604c is screen data corresponding to the selection screen 200 received from the server 12. The status information data 604d is data about the emulator status information, and when emulating the game program 602c according to the emulator program 602d, it is produced and updated. However, when receiving the status information data 604d from the server 12, this status information data 604d is read (loaded) into the data storage area 604. Furthermore, when starting the game from the last continuation, saved status information data 604d is read into the data storage area 604 from the flash memory 54.

Although illustration is omitted, the data storage area 604 is stored with image production data such as polygon data and texture data in order to produce screen data corresponding to various kinds of screens such as the game screen 100. Furthermore, the data storage area 604 is provided with a counter(s) (timer(s)) or/and a flag(s) required for the information processing.

Figure 8:
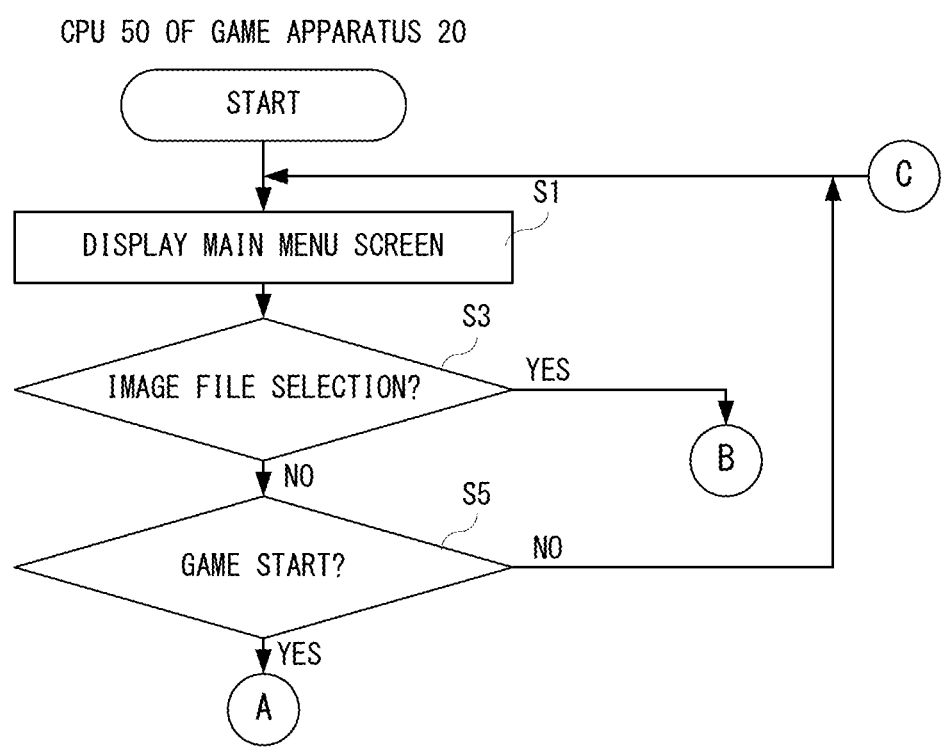
FIG. 8 is a flowchart showing a part of non-limiting example entire processing of a CPU of the game apparatus shown in FIG. 3.
Figure 9:
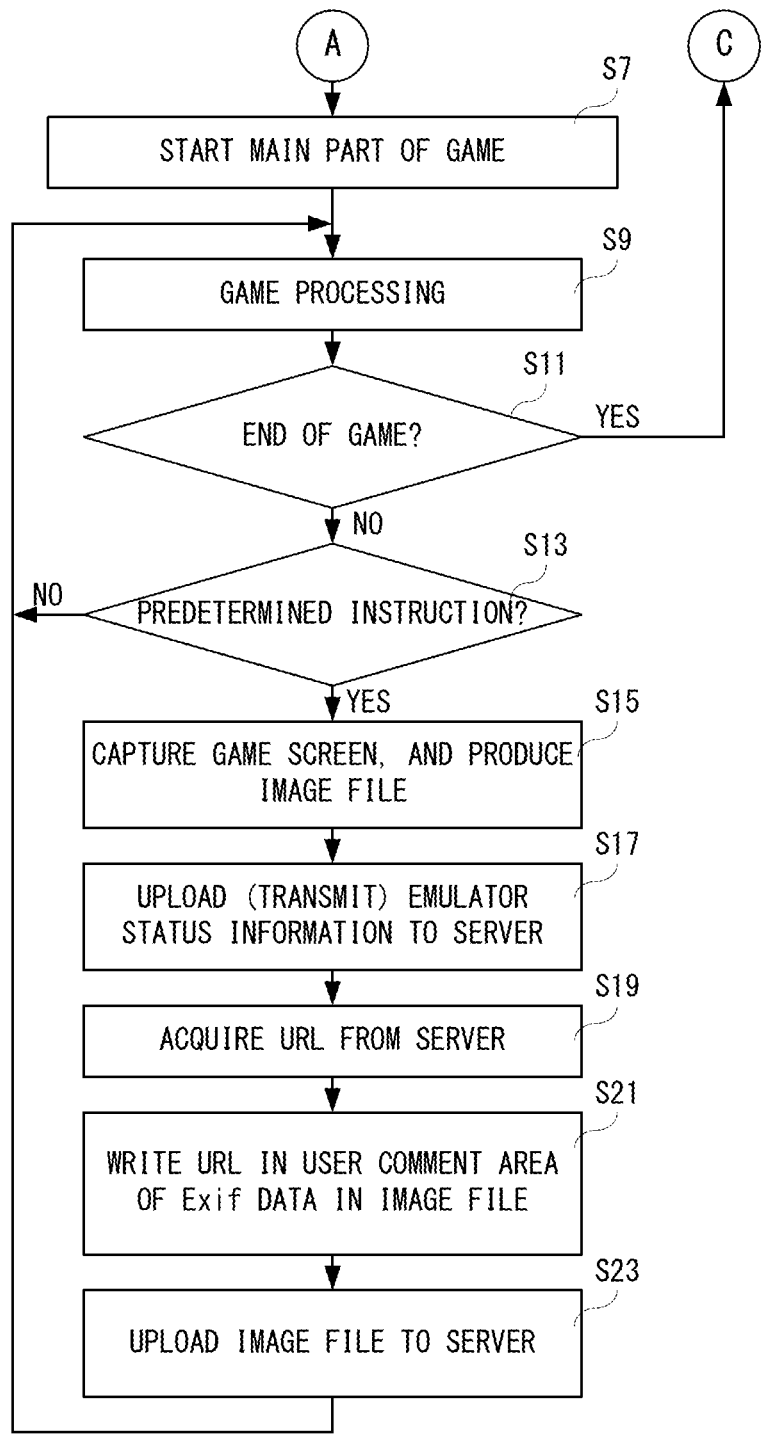
FIG. 9 is a flowchart showing another part of the non-limiting example entire processing of the CPU of the game apparatus shown in FIG. 3, following to FIG. 8.
Figure 10:
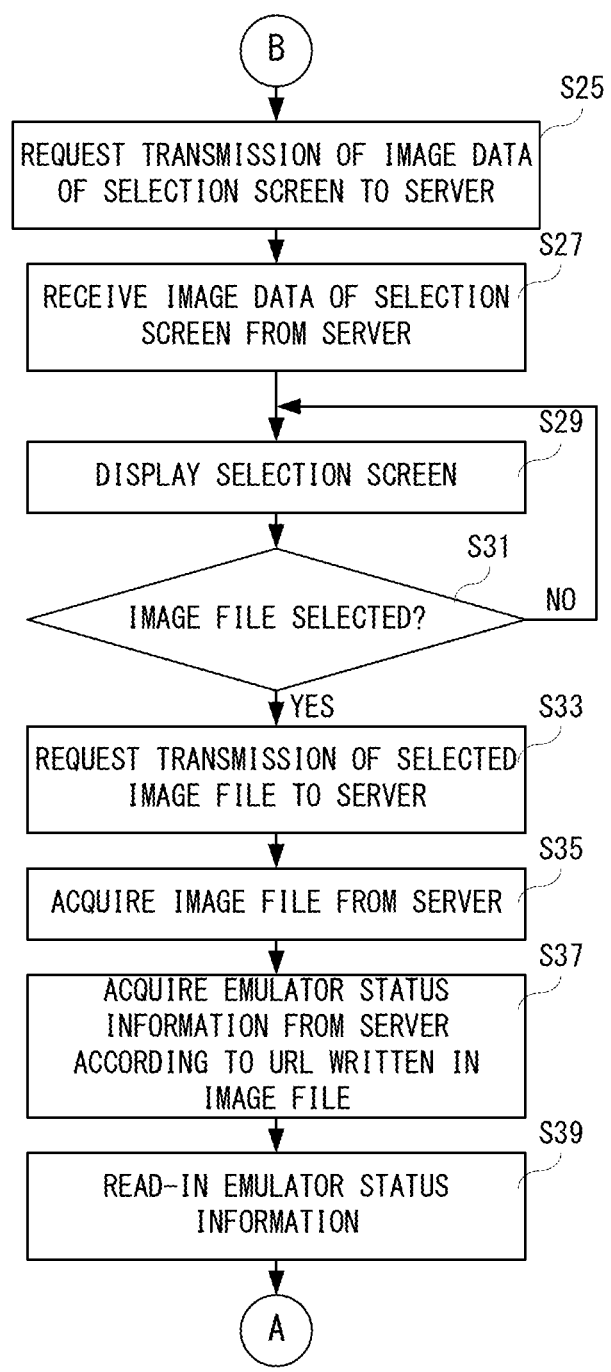
FIG. 10 is a flowchart showing the other part of the non-limiting example entire processing of the CPU of the game apparatus shown in FIG. 3, following to FIG. 8.

FIG. 8 to FIG. 10 is a flowchart showing non-limiting entire processing by the CPU 50 of the game apparatus 20 shown in FIG. 3. As shown in FIG. 8, if starting the entire processing, the CPU 50 displays a main menu screen on the display device 62 in a step S1. Although illustration is omitted, the main menu screen is a screen for designating execution of various kinds of applications, designating selection of an image file, or designating various setting about the game apparatus 20.

Subsequently, in a step S3, it is determined whether the selection of an image file is designated. If "YES" is determined in the step S3, that is, when the selection of an image file is designated, a process proceeds to a step S25 shown in FIG. 10. On the other hand, if "NO" is determined in the step S3, that is, if the selection of an image file is not designated, it is determined whether it is a game start in a step S5. That is, the CPU 50 determines whether the execution of a game application is designated in the main menu screen.

If "NO" is determined in the step S5, that is, if it is not a game start, the process returns to the step S1. On the other hand, if "YES" is determined in the step S5, that is, if it is a game start, as shown in FIG. 9, a main part of the game in a step S7, and game processing is performed in a step S9. In addition, the game program is emulated in this first embodiment. For example, in the game processing, the player character 102 performs, according to an operation of the player, a movement, an arbitrary action or an attack to the enemy character 104, and the enemy character 104 performs a movement, an arbitrary action or an attack to the player character 102 regardless an operation of the player. Furthermore, in the game processing, it is determined whether a course or a game is completed, and if a course or a game is not completed, it is determined whether it becomes the game over. Furthermore, in the game processing, the game screen 100 is updated for each frame. One (1) frame is ⅙₀ seconds, for example. Furthermore, according to a result of the game processing, the status information data 604d is updated.

However, the status information data 604d of a initial status is stored in the data storage area 604 at the time of the game start (before a step S7) when starting the game from the beginning, and the status information data 604d being saved is read (loaded) into the data storage area 604 from the flash memory 54 at the time of the game start when starting the game from the last continuation (scene saved the last time).

In a subsequent step S11, it is determined whether it is an end of game. Here, the CPU 50 determines whether an end of game is designated by the player or whether it becomes the game over. If "YES" is determined in the step S11, that is, if it is the end of game, the process returns to the step S1. That is, the process returns to the main menu. On the other hand, if "NO" is determined in the step S11, that is, if it is not the end of game, it is determined, in a step S13, whether there is a predetermined instruction (contribution instruction, in the first embodiment) is input.

If "NO" is determined in the step S13, that is, if there is no contribution instruction, the process returns to the step S9. On the other hand, if "YES" is determined in the step S13, that is, if there is the contribution instruction, in a step S15, the CPU 50 captures the game screen 100 to produce an image file. In a next step S17, the emulator status information (status information data 604d) is acquired, and the acquired emulator status information is uploaded (transmitted) to the server 12. In response thereto, the server 12 stores (saves) the status information data 604d, and transmits the URL indicative of the storing location to the game apparatus 20 that is a transmission source of the status information data 604d.

In a subsequent step S19, the URL that is transmitted from the server 12 is acquired. In a next step S21, the URL acquired in the step S19 is written in the user comment area of the Exif data included in the image file that is produced in the step S15, and in a step S23, the image file is uploaded (transmitted) to the server 12, and the process returns to the step S9.

As described above, when selecting in the menu screen the selection of the image file, "YES" is determined in the at step S3, in a step S25 shown in FIG. 10, the CPU 50 requests the server 12 to transmit image data of the selection screen, and when receiving the image data of the selection screen from the server 12 in a step S27, displays the selection screen 200 as shown in FIG. 5 on the display device 62 in a step S29. Subsequently, it is determined, in a step S31, whether an image file is selected. That is, it is determined whether a single reduced image is selected from the plurality of reduced images (202-208, etc.) displayed on the selection screen 200. If "NO" is determined in the step S31, that is, if the image file is not selected, the process returns to the step S29. Although illustration is omitted, when designating to stop the selection of the reduced image (image file), the process returns to the main menu (step S1). On the other hand, if "YES" is determined in the step S31, that is, if an image file is selected, the CPU 50 transmits a transmission request of the selected image file to the server 12 in a step S33.

In a next step S35, the image file that the server 12 transmitted is received, and in a step S37, the CPU 50 accesses the server 12 according to the URL written in the user comment area included in the Exif data of the received image file, thereby downloading (acquiring) the emulator status information from the server 12. Then, the emulator status information acquired from the server 12 is read-in in a step S39, that is, the status information data 604$d$ is written in the data storage area 604 of the RAM 52, and then, the process proceeds to the step S7 of FIG. 7. Therefore, in the game apparatus 20, the emulator status at the time when the contribution instruction is input in other game apparatuses (other game apparatuses 20 etc.) is reproduced, whereby the game can be played from the time.

Figure 11:
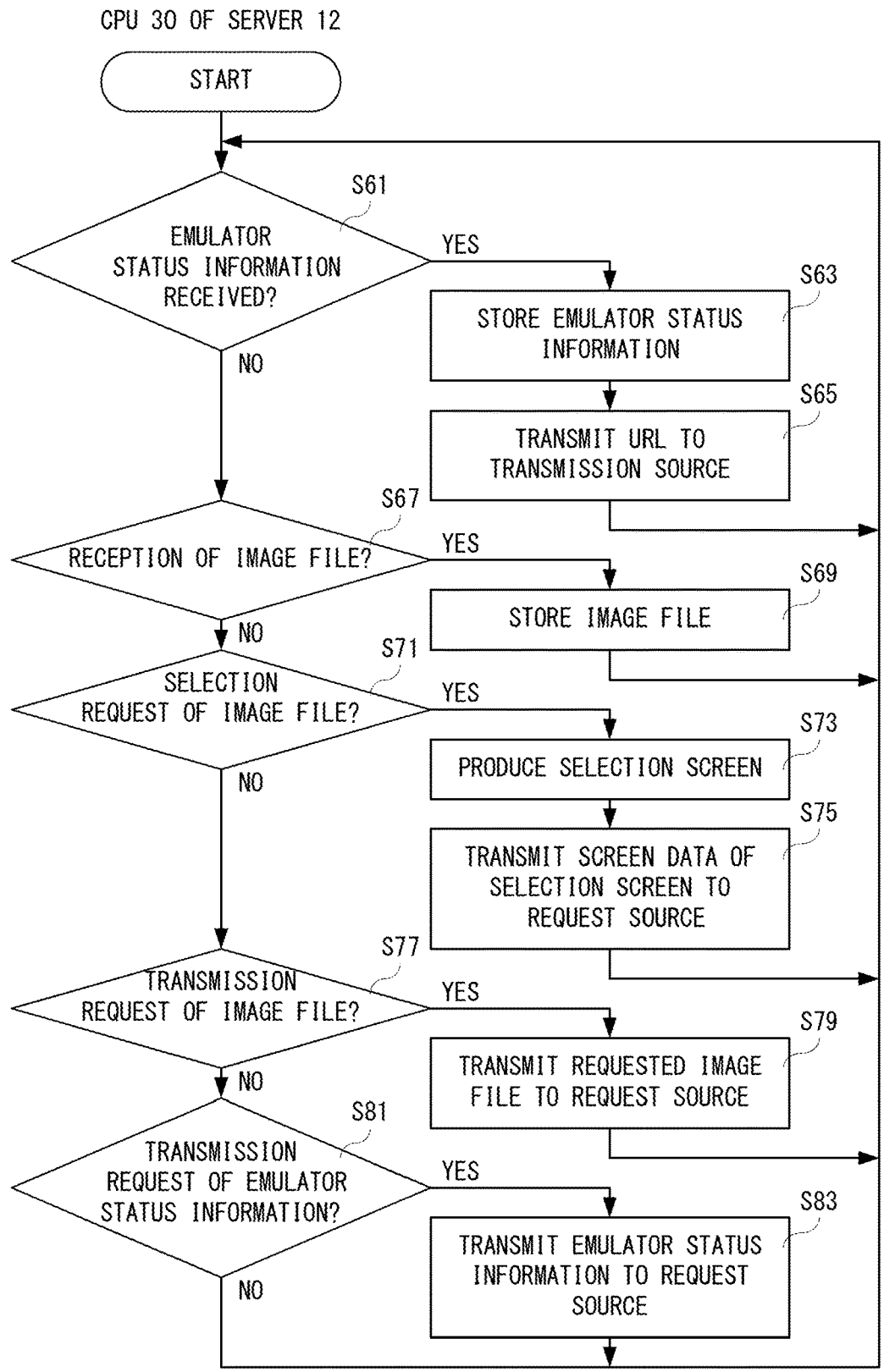
FIG. 11 is a flowchart showing a non-limiting example entire processing of the server shown in FIG. 2.

FIG. 11 is a flowchart showing non-limiting example entire processing by the CPU 30 of the server 12 shown in FIG. 2. As shown in FIG. 11, if the entire processing is started, the CPU 30 of the server 12 determines, in a step S61, whether the emulator status information is received. If "YES" is determined in the step S61, that is, if receiving the emulator status information, the emulator status information is stored (saved) in the HDD 34 in a step S63, and in a step S65, a URL indicative of the storing location is transmitted to the game apparatus 20 that is a transmission source of the emulator status information, and then, the process returns to the step S61.

If "NO" is determined in the step S61, that is, if the emulator status information is not received, it is determined, in a step S67, whether the image file is received. If "YES" is determined in the step S67, that is, if receiving the image file, the received image file is stored in the HDD 34 in a step S69, and the process returns to the step S61.

If "NO" is determined in the step S67, that is, if the image file is not received, it is determined, in a step S71, whether there is a selection request of an image file. If "YES" is determined in the step S71, that is, if there is a selection request of an image file, a selection screen is produced in a step S73, and in a step S75, image data of the selection screen 200 is transmitted to the game apparatus 20 that is a transmission source of the selection request of the image file, and then, the process returns to the step S61.

On the other hand, if "NO" is determined in the step S71, that is, if there is no selection request of an image file, it is determined, in a step S77, whether there is a transmission request of the image file. If "YES" is determined in the step S77, that is, if there is the transmission request of the image file, in a step S79, the requested image file is transmitted to the game apparatus 20 that is a transmission source of the transmission request of an image file, and the process returns to the step S61.

On the other hand, if "NO" is determined in the step S77, that is, if there is no transmission request of an image file, it is determined, in a step S81, whether there is a transmission request of the emulator status information. If "YES" is determined in the step S81, that is, if there is the transmission request of the emulator status information, in a step S83, the requested emulator status information is transmitted to the game apparatus 20 that is a transmission source of the transmission request of the emulator status information, and then, the process returns to the step S61. On the other hand, if "NO" is determined in the step S81, that is, if there is no transmission request of the emulator status information, the process returns to the step S61.

According to this first embodiment, since the emulator status information that a further game apparatus contributes is acquired, and this emulator status information is read, thereby emulating the game program, the scene of the game of a further player can be reproduced. Therefore, it is possible to play the continuation of the reproduced game. Accordingly, it is possible for the players who are temporally or spatially separated from each other to share a game experience.

In addition, although in this first embodiment, when the predetermined instruction is input during execution of the game program, the emulator status information and the image file are transmitted to the server, but it does not need to be limited to this. The emulator status information and the image file may be transmitted to the server while not executing the game program. For example, the emulator status information and the image file may be transmitted to the server according to an instruction of the player, or the emulator status information and the image file may be automatically transmitted to the server at the proper timing that the player sets for transmission. In also such a case, the emulator status information is previously transmitted to the server, the information of the storing location of the status information is acquired from the server, the information of this storing location is written as metadata of the image file, and the image file is transmitted to the server. That is, control programs for contributing the image file, including the image file production program 602$f$, the status information transmission program 602$g$, the URL reception program 602$h$ and the image file transmission program 602$i$, do not need to be executed when the game program 602$c$ is being executed.

However, in this case, according to the instruction of the player, during the game, the status information data is acquired and the image data of the capture image of the game screen 100 is acquired, and the status information data and the image data that are acquired are saved in the flash memory 54. Then, when not executing the game program 602$c$, the status information data saved in the flash memory 54 is uploaded to the server, and the image file about the image data saved in the flash memory 54 is produced and so on.

Furthermore, in this first embodiment, since the emulator status information registered into the server is downloaded and read-in, it is possible to download the emulator status information that is registered in the past by the player himself/herself.

Furthermore, although the image file and the emulator status information are uploaded to the same server in this first embodiment, because the URL indicative of the storing location of the emulator status information is written in the image file, the image file and the emulator status information may be uploaded to separate servers.

Furthermore, in this first embodiment, the game apparatus has a configuration capable of uploading the emulator status information and the image file and downloading the emulator status information and the image file, but the game apparatus may be configured to upload or download.

Specifically, in a case where the game apparatus uploads the emulator status information and the image file, but does not download the emulator status information and the image file, what is necessary is just to delete the steps S3 and S25-S39 in the entire processing shown in FIG. 8-FIG. 10. That is, control programs for acquiring the contributed image file and the emulator status information relevant thereto, including the screen data display program 602$j$, the image file request program 602$k$, the image file reception program 602$m$, the status information request program 602$n$ and the status information reception program 602$p$, are deleted from the information processing program.

Furthermore, what is necessary is just to delete the steps S13-S25 in the entire processing shown in FIG. 8-FIG. 10 in a case where the game apparatus does not upload the emulator status information and the image file, but downloads the emulator status information and the image file. That is, in this case, the control programs (602*f*-602*i*) for contributing the images file as described above are deleted from the information processing program.

Furthermore, although the URL indicative of the storing location of the emulator status information is written in the image file as the reproduction information in this first embodiment, it does not need to be limited to this. Instead of the URL, further information may be written. For example, as the further information, a coupon produced so as to be capable of identifying the emulator status information may be written. In such a case, the game apparatus accesses the server and acquires the emulator status information in exchange for the coupon.

Second Embodiment

Since the second embodiment is the same or similar to the first embodiment except that status information data is written in an image file, a duplicate description will be omitted.

In this second embodiment, if a predetermined instruction (a production instruction of an image file, in the second embodiment) is input, the game apparatus 20 captures the game screen 100 so as to produce an image file about a capture image. Furthermore, if the production instruction of an image file is input, the game apparatus 20 converts the status information data 604*d* into a text data format, and writes the status information data 604*d* that is converted into the text format (hereinafter, called "text data") in the user comment area of the Exif data included in the image file. For example, the status information data 604*d* is binary data, and is converted (encoded) into a text format (ASCII format) by BASE64. Therefore, in the second embodiment, text data is reproduction information.

The image file in which the text data is written is transmitted to a further player while being attached to an email. However, the image file may be uploaded to an SNS or a predetermined contribution site. Therefore, in the second embodiment, the server 12 shown in the first embodiment may function as a server that provides services of a mail server, SNS or contribution site. Therefore, the game apparatus 20 acquires the image file attached to an email according to an operation of the player, or acquires (downloads) the image file from an SNS or a contribution site.

In the game apparatus 20, one or more mage files are acquired, and stored in the flash memory 54. Therefore, in the second embodiment, when selection of an image file is designated in the main menu screen, the image data of the capture image or the data of a thumbnail image is read from each of one or more image files saved in the flash memory 54, and the selection screen 200 as shown in FIG. 5 is displayed on the display device 62.

In this selection screen 200, when the player selects a desired capture image (image file), text data is read from the selected image file, the text data is restored (converted) to the status information data 604*d* to be stored (read) in the RAM 52. In addition, the text data is converted (decoded) into a binary format by BASE64. Therefore, also in the second embodiment, the emulator status at the time when the production instruction of an image file is input in a further game apparatus (further game apparatus 20 etc.) can be reproduced. That is, the player can designate the scene of the game to be reproduced on the selection screen 200, and can reproduce the scene of the designated game, thereby playing the continuation. However, since the image file that is produced by the game apparatus 20 is also included in the flash memory 54, the game at the time when the production instruction of the image file is input in the own game apparatus 20 (at the time of saving) can be also reproduced.

Figure 12:
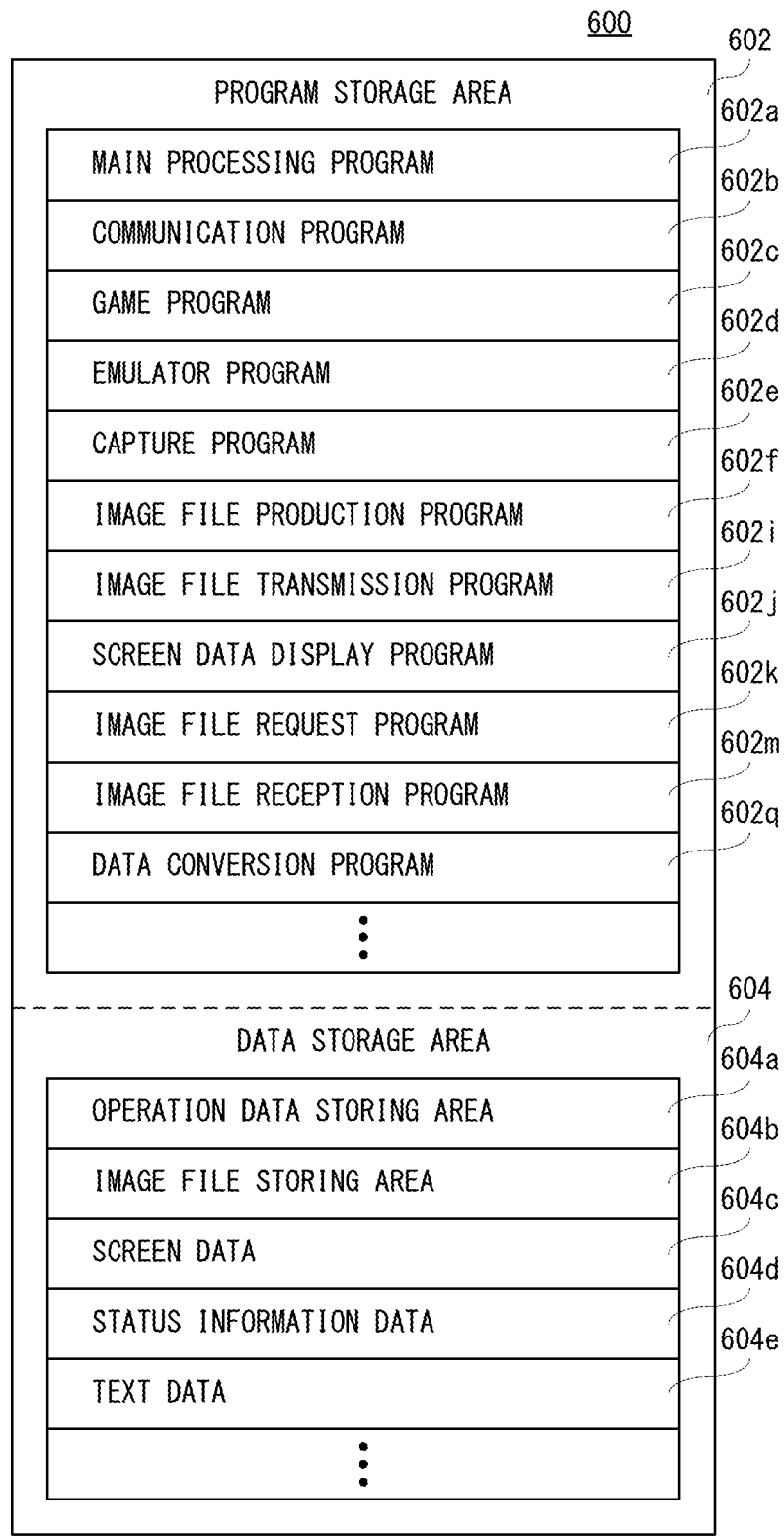
FIG. 12 is an illustration view showing non-limiting example memory map of the RAM of the game apparatus in a second embodiment.

FIG. 12 is an illustration view showing a non-limiting example memory map 600 of the RAM 52 of the game apparatus 20 in the second embodiment. As described above, since the text data is written in the image file, and this image file is transmitted or received (uploaded/downloaded), and the emulator status information itself is not registered into the server 12 in the second embodiment. Accordingly, in the second embodiment, the status information transmission program 602*g*, the URL reception program 602*h*, the status information request program 602*n* and the status information reception program 602*p* all used in the first embodiment are deleted. Furthermore, a data conversion program 602*q* is added.

The data conversion program 602*q* is a program for converting (encoding) the status information data 604*d* into the text data 604*e* of a text format by BASE64, and for converting (decoding) the text data 604*e* into the status information data 604*d* of a binary format by BASE64.

Furthermore, in the second embodiment, according to the image file production program 602*f*, instead of the URL, the text data 604*e* converted according to the data conversion program 602*q* is written into the user comment area of the Exif data included in the image file.

Furthermore, in the second embodiment, an email to which the image file is attached is transmitted to a further game apparatus (further game apparatuses 20 etc.) according to the image file transmission program 602*i*, or the image file is transmitted (uploaded) to a server (server 12, for example) that operates an SNS or a contribution site according to the image file transmission program 602*i*.

Furthermore, in the second embodiment, according to the screen data display program 602*j*, the screen data corresponding to the selection screen 200 is received from a server (server 12, for example) that operates a contribution site.

In addition, as described above, the image data of the capture image or the image data of the thumbnail image is read from each of one or more image files saved at the flash memory 54, and when displaying the selection screen 200 shown in FIG. 5 on the display device 62, a program for producing image data corresponding to various kinds of screens except for the game screen that is producing by emulation and a program for outputting (displaying) the produced screen data to the display device 62 are executed.

Furthermore, in the second embodiment, according to the image file request program 602*k*, a transmission request of an image file is transmitted to a server (server 12, for example) that operates an SNS or a contribution site.

Furthermore, in the second embodiment, the image file attached to the email that is received from the further game apparatus 20 according to the image file reception program 602*m*, or the image file that the transmission request is transmitted according to the image file request program 602*k* is received (downloaded) from a server (server 12, for example) that operates an SNS or a contribution site.

Figure 13:
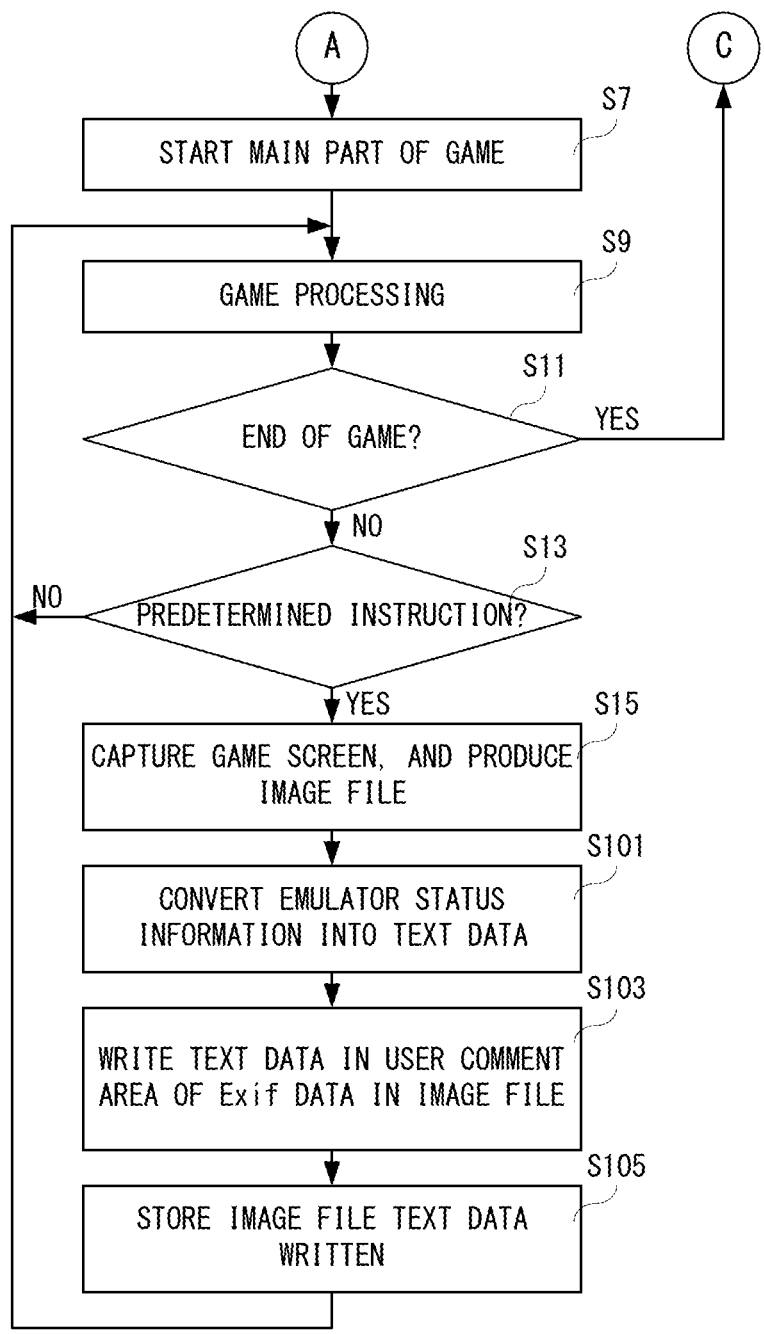
FIG. 13 is a flowchart showing a part of non-limiting example entire processing of the CPU of the game apparatus in the second embodiment, following to FIG. 8.
Figure 14:
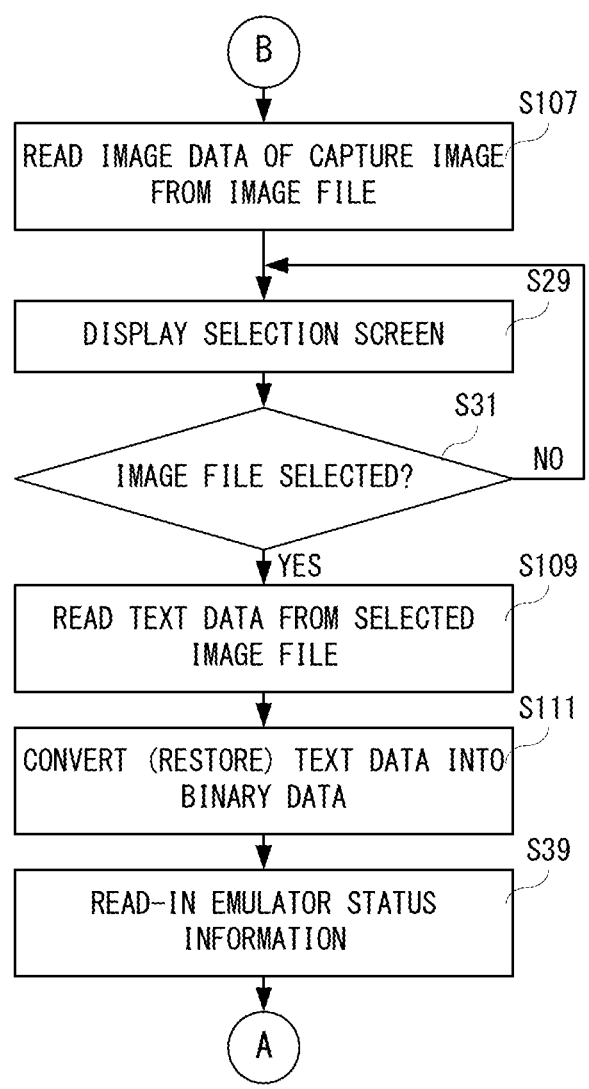
FIG. 14 is a flowchart showing the other part of the non-limiting example entire processing of the CPU of the game apparatus in the second embodiment, following to FIG. 8.

Next, although it will be described about entire processing by the CPU 50 of the game apparatus 20 in the second embodiment, about the same or similar contents to those of the first embodiment, illustration and description are omitted, or simply described. FIG. 13 and FIG. 14 are flowcharts showing a part of entire processing of the CPU 50 of the game apparatus 20 in the second embodiment, following FIG. 8.

As shown in FIG. 13, if a predetermined instruction (a production instruction of an image file, in the second embodiment) is input during a game, in the second embodiment, "YES" is determined in the step S13, and in the step S15, the game screen is captured, thereby producing an image file. In a subsequent step S101, the emulator status information (status information data 604d) is converted into the text data 604e by BASE64, and in a step S103, the text data 604e converted in the step S101 is written into the user comment area of the Exif data included in the image file that is produced in the step S15, and in a step S105, the image file in which the text data 604e written is stored in the flash memory 54, and the process returns to the step S9.

Furthermore, if designating the selection of an image file in the main menu screen, "YES" is determined in the step S3, and as shown in FIG. 14, in a step S107, the image data of the capture image or the image data of the thumbnail image is read from the image file, thereby displaying the selection screen 200 as shown in FIG. 5 on the display device 62 in the step S29.

Then, if selecting an image file in the selection screen 200, "YES" is determined in the step S31, and the text data 604e is read from the selected image file in a step S109, and in a step S111, the text data 604e is converted (decoded) into the emulator status information (status information data 604d of the binary format), and the process proceeds to the step S39.

In addition, although illustration is omitted, a contribution site is operated by the server 12, in the entire processing by the CPU 30 of the server 12 shown in FIG. 11, the steps S61-S65, S81 and S83 are deleted, and in the game apparatus 20, it is sufficient that the processing that transmits and receives an email to which the image file is attached, or the processing that uploads/downloads the image file are performed separately from the entire processing. A technique for transmitting and receiving an email to which the image file is attached and a technique for uploading the image file to an SNS or a contribution site, or downloading the image file from an SNS or a contribution site are already well-known, and therefore, a description thereof is omitted.

In also the second embodiment, like the first embodiment, it is possible to reproduce the scene of the game of other players and can play the continuation of the reproduced game. Accordingly, it is possible for players who are temporally or spatially separated from each other to share a game experience.

In addition, although the image file of a still picture such as a capture image is produced in the above-described embodiments, an image file of moving image may be produced. In such a case, a moving image (or still pictures of two or more sheets) of few or several seconds—few or several tens of seconds in length after the contribution instruction or the production instruction of the image file is input is produced. Therefore, in this case, the player can select the image file to be downloaded while seeing the moving image.

Furthermore, although the image file about the image data of a JPEG format is produced in the above-described embodiments, the format of the image should not be limited. For example, other general-purpose format such as TIFF, BMP, GIF or the like may be sufficient. Even when any of formats is adopted, as the metadata of the image file, the URL or text-converted status information data is written (included).

Furthermore, although it is intended that the emulator status of other game apparatuses is reproduced by emulating the game program in the above-described embodiments, it does not need to be limited to this. For example, that game data that is produced when the game program is executed (without emulation) may be transmitted to the server as shown in the first embodiment instead of the status information data, or the game data that is contributed by other game apparatuses may be acquired (received) from the server, or as shown in the second embodiment, the image file may be transmitted or received to or from other game apparatuses while the game data is converted into the text data and written in the image file.

In such a case, in other game apparatuses at a side that receives the game data, the game program using the game data transmitted or received is executed. Furthermore, in such a case, since the hardware configuration of the game apparatus is not necessarily the same, unlike a case where the game program is emulated, the status of the CPU (the values of the various kinds of registers) is not acquired.

For this reason, it is impossible to completely reproduce the scene of the game. For example, directions or/and postures of various kinds of characters and various kinds of objects cannot be reproduced. However, it is possible to reproduce the scene of the game and to play the game from the reproduced scene with using the information included in the game data, such as the virtual course under play, the various kinds of characters and various kinds of objects existing in this virtual course and positions thereof, the state of the player character (size, transformation), the remaining number, the remaining time, kinds and the number of the items that the player character owns, the score, etc.

Furthermore, although the game apparatus is shown as an example of an information processing apparatus in the above-described embodiments, it does not need to be limited to this. As long as various kinds of applications such as a game can be executed, it is possible to use other information processing apparatuses, such as general-purpose PCs (desktop PCs, note PCs, tablet PCs), PDA, smartphones, feature phones, etc. Furthermore, the game system shown in the above-described embodiments is an example of an information processing system.

Although certain example systems, methods, storage media, devices and apparatuses have been described herein, it is to be understood that the appended claims are not to be limited to the systems, methods, storage media, devices and apparatuses disclosed, but on the contrary, are intended to cover various modifications and equivalent arrangements included within the spirit and scope of the appended claims.

What is claimed is:

1. A game system, comprising:
   a first game apparatus;
   a second game apparatus different from the first game apparatus; and
   a server,
   wherein the first game apparatus is configured to:
      execute a game according to a game program;
      produce an image file that includes reproduction information required in order to reproduce a scene of the game, corresponding to a specific moment in the game program that is currently executed, as metadata, and image data for the scene of the game; and
      transmit the produced image file to the server, and
   wherein the second game apparatus is configured to:
      acquire the image file from the server; and
      execute the same kind of game program as the game program based on the reproduction information included in the acquired image file while designating a scene of the game to be reproduced.

2. The game system according to claim 1, wherein
the first game apparatus is further configured to acquire, when the game program is executed, at least status information including game data about the game of the game program, and transmit the acquired status information to the server, and
the second game apparatus is further configured to acquire the status information from the server according to the reproduction information included in the acquired image file, and
execute the game program using the acquired status information.

3. The game system according to claim 2, wherein the reproduction information includes information indicative of a storing location of the status information, and the second game apparatus is configured to acquire the status information from the storing location that is indicated by the reproduction information.

4. The game system according to claim 3, wherein the first game apparatus is configured to acquire the information indicative of a storing location of the status information from the server when the status information is transmitted to the server, and produce the image file that includes as metadata the information indicative of a storing location of the status information.

5. The game system according to claim 2, wherein each of the first game apparatus and the second game apparatus are further configured to execute an emulator program and emulate the game program by executing the emulator program, and
the status information is status information of an emulator.

6. The game system according to claim 2, wherein the status information is a game parameter in the game program, and each of the first game apparatus and the second game apparatus executes the game program using the game parameter.

7. The game system according to claim 1, wherein the server is configured to produce screen data corresponding to a selection screen for selecting a single image file from a plurality of image files,
the second game apparatus is further configured to select a single image file from the plurality of image files in the selection screen corresponding to the produced screen data, and acquire the image file that is selected.

8. The game system according to claim 1, wherein the image file is of a general-purpose file format.

9. The game system according to claim 8, wherein the general-purpose file format is a JPEG format.

10. The game system according to claim 9, wherein the reproduction information is described in a user comment area that is included in Exif data of the image file of the JPEG format.

11. The game system according to claim 1, wherein each of the first game apparatus and the second game apparatus is capable of executing a plurality of different kinds of game programs, and
the first game apparatus is configured to transmit image files about scenes of games of the plurality of different kinds of game programs to the server.

12. A non-transitory computer-readable storage medium storing a control program executable by a game apparatus that is included in a game system comprising a plurality of game apparatuses and a server, wherein the control program, when executed by a computer of the game apparatus, causes the game apparatus to:
produce an image file that includes reproduction information required in order to reproduce a scene of a game, corresponding to a specific moment in a game program that is currently executed by the game apparatus, as metadata, and image data for the scene of the game; and
transmit the produced image file to the server.

13. A non-transitory computer-readable storage medium storing a control program executable by a game apparatus that is included in a game system comprising a plurality of game apparatuses and a server, wherein the control program, when executed by a computer of the game apparatus, causes the game apparatus to:
acquire an image file from the server; and
execute a game program about a game based on reproduction information included in the image file that is acquired while designating a scene of the game to be reproduced, the image file including the reproduction information corresponding to a specific moment in a game program, as metadata, and image data for the scene of the game to be reproduced.

14. The game system according to claim 1, wherein the reproduction information further includes emulator status information that is transmitted to the server in the image file.

15. The game system according to claim 14, wherein the emulator status information includes status information of an emulated virtual CPU and an emulated virtual memory.

16. The game system according to claim 15, wherein the status information of the emulated virtual CPU includes data stored in one or more registers included in the virtual CPU, and the status information of the emulated virtual memory includes image data stored in an emulated virtual RAM (VRAM) and game parameter data stored in the emulated VRAM.

17. The game system according to claim 1, wherein the first game apparatus receives a Uniform Resource Locator (URL) from the server and writes the URL into a comment area included in exchangeable image file format (Exif) data of the image file.

18. The game system according to claim 1, wherein a Uniform Resource Locator (URL) indicative of storing location of emulator status information is included at the metadata of the image file.

* * * * *